(12) United States Patent
Ibrahim et al.

(10) Patent No.: US 12,312,241 B1
(45) Date of Patent: May 27, 2025

(54) ZINC-VANADIUM CATALYST FOR HYDROGEN GENERATION

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Ahmed Bayoumi Mohamed Ibrahim, Riyadh (SA); Peter Mayer, Münche (DE)

(73) Assignee: IMAM MOHAMMAD IBN SAUD ISLAMIC UNIVERSITY, Riyadh (SA)

(*) Notice: Subject to any disclaimer, the term of this patent is extended or adjusted under 35 U.S.C. 154(b) by 0 days.

(21) Appl. No.: 18/976,912

(22) Filed: Dec. 11, 2024

(51) Int. Cl.
| | | |
|---|---|---|
| *C01B 3/06* | (2006.01) | |
| *B01J 23/06* | (2006.01) | |
| *B01J 23/22* | (2006.01) | |
| *B01J 35/70* | (2024.01) | |
| *B01J 37/04* | (2006.01) | |
| *B01J 37/08* | (2006.01) | |

(52) U.S. Cl.
CPC .............. *C01B 3/065* (2013.01); *B01J 23/06* (2013.01); *B01J 23/22* (2013.01); *B01J 35/70* (2024.01); *B01J 37/04* (2013.01); *B01J 37/08* (2013.01)

(58) Field of Classification Search
CPC .. C01B 3/065; B01J 23/06; B01J 23/22; B01J 35/70; B01J 37/04; B01J 37/08
See application file for complete search history.

(56) References Cited

U.S. PATENT DOCUMENTS

2012/0225008 A1    9/2012   Pinkerton

FOREIGN PATENT DOCUMENTS

| CN | 102583241 A |   | 7/2012 |
|---|---|---|---|
| CN | 105958086 A | * | 9/2016 |
| CN | 116161616 A |   | 5/2023 |

OTHER PUBLICATIONS

Udomvech et al. (Spectroscopy, thermal analysis and crystal structure of a novel diammonium bis[hexaaquazinc(II)] decavanadate tetrahydrate, Inorganic Chemistry Communications, 2012) (Year: 2012).*

Amini et al. (Synthesis and characterization of a new polyoxovanadate for the one-pot three-component (A3) coupling of aldehydes, amines and alkynes, Molecular Catalysis, 2020) (Year: 2020).*

M.R. Todorović, et al., "Synthesis and Characterization of Ammonium Decavanadate (V)", Materials Science Forum, vol. 494, Sep. 15, 2005, pp. 351-356, 7 pages.

Goran A. Bogdanović, et al., "Low temperature crystal structure, experimental atomic charges and electrostatic potential of ammonium decavanadate hexahydrate (NH4)V10O28•6H2O", Journal of the Serbian Chemical Society, vol. 72, No. 6, 2007, pp. 545-554.

* cited by examiner

Primary Examiner — Sally A Merkling
Assistant Examiner — Logan Edward Laclair
(74) Attorney, Agent, or Firm — Oblon, McClelland, Maier & Neustadt, L.L.P.

(57) ABSTRACT

A method of producing hydrogen gas comprising: hydrolyzing sodium borohydride ($NaBH_4$) with water at a temperature of from about 20 to about 75° C. in the presence of ammonium-zinc decavanadate hexadecahydrate (($NH_4)_2[Zn(H_2O)_6]_2 \cdot V_{10}O_{28} \cdot 4H_2O$); and, capturing hydrogen gas evolved as a hydrolysis product.

20 Claims, 6 Drawing Sheets

---

50

Hydrolyze sodium borohydride ($NaBH_4$) with water at a temperature of from about 20 to about 75 °C in a presence of ammonium-zinc decavanadate hexadecahydrate (($NH_4)_2[Zn(H_2O)_6]_2 \cdot V_{10}O_{28} \cdot 4H_2O$) — 52

↓

Capture hydrogen gas evolved as a hydrolysis product — 54

ZINC-VANADIUM CATALYST FOR HYDROGEN GENERATION

STATEMENT OF ACKNOWLEDGEMENT

Support provided by the Imam Mohammad Ibn Saud Islamic University (IMSIU) is gratefully acknowledged.

BACKGROUND

Technical Field

The present disclosure is directed towards clean energy generation and, more particularly, towards a method of producing hydrogen utilizing zinc-vanadium catalysts.

Description of Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly nor impliedly admitted as prior art against the present invention.

In recent history, global energy demand has increased multi-fold and poses a serious threat to the resources of fossil fuels and to the environment. In general, burning fossil fuels releases carbon dioxide, nitrogen oxides (NOx), sulfur oxides (SOx), and particulate matter into the atmosphere, which leads to a variety of environmental pollution issues. In order to meet the growing demand for energy, a quest for alternative energy sources has been prompted. Meta analysis of bodies of research has provided a clear conclusion: a transition to clean, renewable energy sources is required on account of the depletion of non-renewable energy supplies and environmental concerns.

Solar energy is considered as a primary source of renewable energy, primarily as solar energy generation is inexpensive. However, solar energy storage relies on expensive batteries and other energy storage devices: these devices are disposable, translating to a need for their frequent replacement. Consequently, in part due to its high energy density (120 megajoules per kilograms (MJ/kg)), non-toxicity, and ecological friendliness, hydrogen gas has emerged as an important energy carrier among renewable sources.

Hydrogen energy provides numerous advantages over batteries in terms of energy conservation and the powering of diverse applications. The key benefit of high energy density is that hydrogen can store greater energy in less volume: this renders hydrogen optimal for applications such as transportation, where weight and space are paramount. Refueling a hydrogen vehicle requires only a few minutes, akin to conventional gasoline automobiles, whereas charging batteries can be far more time-consuming. Hydrogen fuel cells, for instance, offer extended ranges relative to battery electric vehicles, rendering fuel-cell powdered vehicles appropriate for heavy-duty applications and long-distance journeys. In larger-scale vehicular applications, such as trucks or ships, hydrogen fuel cells may be lighter than comparable battery systems, which is essential for efficiency and payload capacity. Moreover, in contrast to batteries, which deteriorate over time and necessitate replacement, hydrogen systems can sustain performance for an extended duration with adequate maintenance. Hydrogen production can, moreover, be amplified from renewable sources, potentially resulting in sustainable and extensive energy storage options: the generation of hydrogen through electrolysis utilizing solar or wind energy is an important example. Hydrogen derived from renewable sources furthermore provides a clean energy alternative, generating solely water vapor when utilized in fuel cells.

Hydrogen is applicable in other areas outside transportation, including industrial operations, heating, and energy storage, hence offering variety in energy solutions. Hydrogen can retain surplus renewable energy for extended durations, assisting in the equilibrium of supply and demand within the energy system. Hydrogen can stabilize the electrical grid by serving as a versatile energy storage solution, absorbing surplus energy during peak production periods.

Despite its inherent advantages, the difficulties in safely storing and transporting hydrogen have stymied its widespread utilization.

Hydrogen is typically stored either: under compression; as a liquid under deep refrigeration; through being chemically bound within a metal hydride; or, through being chemically bound within other compounds. Sodium borohydride ($NaBH_4$) has become an important compound for hydrogen storage given its stability, non-flammability and non-toxicity: $NaBH_4$ further contains two moles of hydrogen ($H_2$) and that hydrogen constitutes 10.8 wt. % of the compound.

When required, hydrogen is released from $NaBH_4$ by hydrolysis:

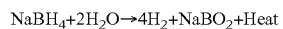

$$NaBH_4 + 2H_2O \rightarrow 4H_2 + NaBO_2 + Heat$$

According to this reaction, the hydrolysis releases the 2 moles of hydrogen bound within the $NaBH_4$, as well as hydrogen bound within the reactant water.

$NaBH_4$ may undergo self-hydrolysis but this occurs at a very slow reaction rate. Consequently, either heterogeneous or homogeneous catalysts are employed to drive the hydrolysis reaction at viable temperatures, such as temperatures close to room temperature. Heterogeneous catalysts are preferred in this context on the basis that they: typically possess longer functional lifetimes; can be facilely separated from the sodium metaborate ($NaBO_2$) solution formed as a co-product of the hydrolysis reaction; and, are not associated with the formation of gaseous side products, such as diborane.

Active heterogeneous catalysts for the hydrolysis process of sodium borohydride have predominantly been based on noble metals, such as Pt, Ru and Pd. [See: Huff C, LongJM, Heyman A, Abdel-Fattah T M (2018) *ACS Appl Energy Mater* 1:4635-4640; Brack P, Dann S E, Wijayantha K G U (2015) *Energy Sci Eng* 3:174-188; Wei L, Ma M, Wang D, Wang Q, Lu Y, Zhang S (2018) *Funct. Mater Lett.* 11:1850079.] However, such noble metals are associated with high costs, low abundance and toxicity [See Bullock R M (2017) *Chemistry* 2:444-446].

Accordingly, one object of the present disclosure is to provide a method of producing hydrogen via a zinc-vanadium catalyst that may circumvent the drawbacks, such as, economical limitations, environmental limitations, and poor yield, of methods and materials known in the art.

SUMMARY

In an exemplary embodiment, a method of producing hydrogen gas is described. The method comprises hydrolyzing sodium borohydride ($NaBH_4$) with water at a temperature of from about 20° C. to about 75° C. in the presence of ammonium-zinc decavanadate hexadecahydrate (($NH_4)_2[Zn(H_2O)_6]_2 \cdot V_{10}O_{28} \cdot 4H_2O$). The method further comprises capturing hydrogen gas formed by the hydrolyzing.

In some embodiments, the ammonium-zinc decavanadate hexadecahydrate $((NH_4)_2[Zn(H_2O)_6]_2 \cdot V_{10}O_{28} \cdot 4H_2O)$ is a crystalline particulate having a triclinic crystal system, as determined by single crystal X-ray crystallographic analysis.

In some embodiments, the ammonium-zinc decavanadate hexadecahydrate $((NH_4)_2[Zn(H_2O)_6]_2 \cdot V_{10}O_{28} \cdot 4H_2O)$ has a three-dimensional crystalline structure, as determined by single crystal X-ray crystallographic analysis, comprising centrosymmetric $[V_{10}O_{28}]^{6-}$ anions linked via hydrogen bonding by two $NH_4^+$ cations, two $[Zn(H_2O)_6]_2^+$ cations and four water molecules. The ammonium-zinc decavanadate hexadecahydrate $((NH_4)_2[Zn(H_2O)_6]_2 \cdot V_{10}O_{28} \cdot 4H_2O)$ catalyzes the hydrolysis of the sodium borohydride to provide a hydrogen generation rate of about 500 mL min$^{-1}$ g$^{-1}$ to about 5000 mL min$^{-1}$ g$^{-1}$.

In some embodiments, the method of hydrolyzing sodium borohydride comprises mixing water with a solid mixture which comprises particles of the sodium borohydride ($NaBH_4$) and crystalline particles of the ammonium-zinc decavanadate hexadecahydrate $((NH_4)_2[Zn(H_2O)_6]_2 \cdot V_{10}O_{28} \cdot 4H_2O)$.

In some embodiments, the method of hydrolyzing sodium borohydride comprises contacting an aqueous solution of sodium borohydride ($NaBH_4$) with crystalline particulate ammonium-zinc decavanadate hexadecahydrate $((NH_4)_2[Zn(H_2O)_6]_2 \cdot V_{10}O_{28} \cdot 4H_2O)$ at a temperature of from about 20° C. to about 75° C.

In some embodiments, the aqueous solution comprises from about 5 wt. % to about 20 wt. % of sodium borohydride ($NaBH_4$) based on the weight of the solution, and during the hydrolyzing hydrogen gas is the only gas formed.

In some embodiments, the aqueous solution comprises from about 5 wt. % to about 15 wt. % of sodium borohydride ($NaBH_4$) based on the weight of the solution, and the hydrolyzing is carried out in a reaction vessel containing only the ammonium-zinc decavanadate hexadecahydrate $((NH_4)_2[Zn(H_2O)_6]_2 \cdot V_{10}O_{28} \cdot 4H_2O)$, the sodium borohydride and water.

In some embodiments, the aqueous solution further comprises from about 1 wt. % to about 20 wt. % of sodium hydroxide (NaOH) based on the weight of the solution.

In some embodiments, the hydrolysis temperature is from about 25° C. to about 60° C.

In some embodiments, the hydrolysis temperature is from about 25° C. to about 50° C.

In some embodiments, the ratio by weight of sodium borohydride to ammonium-zinc decavanadate hexadecahydrate is from about 1:2 to about 5:1.

In some embodiments, the ratio by weight of sodium borohydride to ammonium-zinc decavanadate hexadecahydrate is from about 1:2 to about 3:1.

In some embodiments, the ratio by weight of sodium borohydride to ammonium-zinc decavanadate hexadecahydrate is from about 1:2 to about 2:1.

In another exemplary embodiment, a method of forming the ammonium-zinc decavanadate hexadecahydrate $((NH_4)_2[Zn(H_2O)_6]_2 \cdot V_{10}O_{28} \cdot 4H_2O)$ is described. The method comprises: preparing a first solution in distilled water of ammonium metavanadate ($NH_4VO_3$) and an ammonium salt of a chelating acid; adding zinc chloride to the first solution under heating to a temperature of from about 30° C. to about 100° C. to form a second solution; and, crystallizing ammonium-zinc decavanadate hexadecahydrate from the second solution.

In some embodiments, the chelating acid is an α-hydroxycarboxylic acid.

In some embodiments, the ammonium salt of a chelating acid is selected from the group consisting of ammonium glycolate, ammonium lactate, ammonium citrate, ammonium tartrate, and ammonium malate.

In some embodiments, the first solution is prepared by adding particles of the ammonium metavanadate and particles of the ammonium salt of the chelating acid to distilled water, and under stirring, heating the obtained mixture to a temperature of from about 60° C. to about 100° C.

In some embodiments, the first solution is filtered at a temperature of from about 60° C. to about 100° C. prior to the addition of zinc chloride thereto.

In some embodiments, the zinc chloride is added to the first solution in an amount such that the molar ratio of zinc ($Zn^{2+}$) to metavanadate ($VO_3^-$) is from about 1:3 to about 1:1.

In some embodiments, the zinc chloride is added to the first solution in an amount such that the molar ratio of zinc ($Zn^{2+}$) to metavanadate ($VO_3^-$) is about 1:2.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
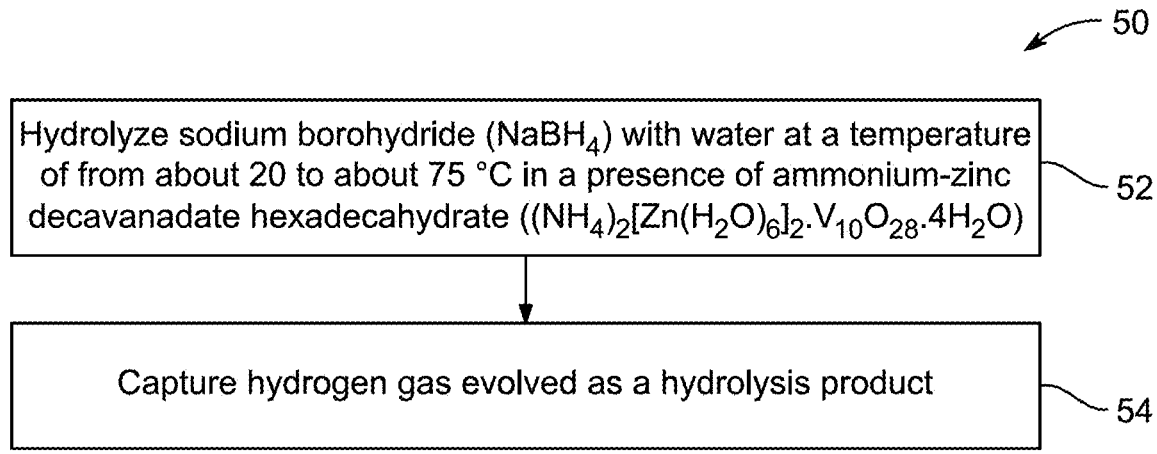
FIG. 1A is a flowchart of a method of hydrogen generation from $NaBH_4$, according to certain embodiments.

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

The terms "approximately," "approximate," "about," and similar terms generally refer to ranges that include the identified value within a margin of 20%, 10%, or preferably 5%, and any values therebetween.

As used herein, the words "a," "an" and the like generally carry a meaning of "one or more," unless stated otherwise.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term 'particle' refers to a small object that acts as a whole unit with regard to its transport and properties.

Unless otherwise stated, the term "particle size" refers to the largest axis of the particle. In the case of a generally spherical particle, the largest axis is the diameter.

The term "median volume particle size" (Dv50), as used herein, refers to a particle size corresponding to 50% of the volume of the sampled particles being greater than and 50% of the Oblon Ref. 555466 US volume of the sampled particles being smaller than the recited Dv50 value. Particle size is determined herein by Scanning Electron Microscopy (SEM).

As used herein, the term 'room temperature' refers to a temperature range of '25 degrees Celsius (° C.)±3° C.

Hydrolysis, as used herein, is the chemical reaction of a molecule with water to produce two or more smaller molecules.

As used herein, the term "chelating acid" refers to an organic acid that has the ability to bind or coordinate with a metal ion to form a stable, cyclic complex. These acids contain multiple donor atoms, such as oxygen or nitrogen, that can interact with a metal ion, creating a chelate (a ring-like structure). This chelation process helps in stabilizing metal ions in solution, preventing them from reacting or precipitating.

As used herein, the term "hydrogen generation rate" refers to the rate at which hydrogen gas ($H_2$) is produced in a given system or reaction. It is typically measured as the volume of hydrogen generated per unit of time (e.g., milliliters per minute, liters per hour) and is an important parameter in processes such as water splitting, electrolysis, or hydrogen production from chemical reactions (e.g., from metals or alloys reacting with acids).

Aspects of this disclosure are directed to a method of producing hydrogen gas is described. Producing hydrogen gas as a clean fuel is crucial for reducing carbon emissions and combating climate change. It offers a sustainable alternative to fossil fuels, with only water vapor as a byproduct when used in energy systems.

Aspects of the present disclosure are directed toward a catalyst system designed to enhance the hydrolysis of sodium borohydride ($NaBH_4$) for efficient hydrogen generation. It utilizes a Zn—V cluster which is easy to prepare and offers a high hydrogen generation rate (HGR) in a short time. This catalyst system facilitates the safe and rapid release of hydrogen from $NaBH_4$, making it an efficient solution for clean hydrogen production. The present disclosure circumvents the drawbacks of the prior art by addressing key limitations such as high catalyst costs, slow reaction rates, and environmental concerns. Traditional catalysts often require expensive materials and result in inefficient or slow hydrogen production. In contrast, the present disclosure uses a cost-effective catalyst that promotes faster hydrogen generation without relying on toxic or scarce materials. The simplicity of its preparation and its high catalytic activity also ensure scalability and practical applicability, making it a more efficient and sustainable alternative to existing methods.

FIG. 1A illustrates a flow chart of a method 50 of hydrogen generation from $NaBH_4$. Hydrogen generation from sodium borohydride ($NaBH_4$) refers to the process in which $NaBH_4$ reacts with water (or other suitable reactants) to release hydrogen gas ($H_2$). The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 comprises hydrolyzing sodium borohydride ($NaBH_4$) with water at a temperature of from about 20 to about 75° C. in the presence of ammonium-zinc decavanadate hexadecahydrate $((NH_4)_2[Zn(H_2O)_6]_2 \cdot V_{10}O_{28} \cdot 4H_2O)$.

The hydrolysis temperature may range from 20° C. to about 75° C., for example from about 25° C. to about 60° C., from about 25° C. to about 50° C., from about 30° C. to about 55° C., from about 35° C. to about 50° C., or from about 40° C. to about 45° C.

In some embodiments, the hydrolysis process may comprise mixing water with a solid mixture comprising particles of the sodium borohydride ($NaBH_4$) and crystalline particles of the ammonium-zinc decavanadate hexadecahydrate.

In certain other embodiments, the hydrolysis process may comprise contacting an aqueous solution of sodium borohydride ($NaBH_4$) with crystalline particulate ammonium-zinc decavanadate hexadecahydrate $((NH_4)_2[Zn(H_2O)_6]_2 \cdot V_{10}O_{28} \cdot 4H_2O)$.

In this embodiment, the concentration of sodium borohydride ($NaBH_4$) in the aqueous solution may range from about 0.1 to about 5 moles per litre (M), for example from about 0.2 to about 5 M, from about 0.3 to about 5 M, from about 0.4 to about 5 M, from about 0.5 to about 5 M, from about 0.6 to about 5 M, from about 0.7 to about 5 M, from about 0.8 to about 5 M, from about 0.9-5 M, from about 1.0 to about 5 M, from about 1.5 to about 5 M, from about 2.0 to about 5 M, from about 2.5 to about 5 M, from about 3.0 to about 5 M, from about 4.0 to about 5 M, or from about 4.5 to about 5 M.

In some embodiments, the aqueous solution may comprise from about 5 to about 20 wt. %, for example from about 5 to about 15 wt. %, from about 6 to about 20 wt. %, from about 7 to about 20 wt. %, from about 8 to about 20 wt. %, from about 9 to about 20 wt. %, from about 10 to about 20 wt. %, from about 11 to about 20 wt. %, from about 12 to about 20 wt. %, from about 13 to about 20 wt. %, from about 14 to about 20 wt. %, from about 15 to about 20 wt. %, from about 16 to about 20 wt. %, from about 17 to about 20 wt. %, from about 18 to about 20 wt. %, or from about 19 to about 20 wt. %, of sodium borohydride ($NaBH_4$) based on the weight of the solution.

The hydrolysis process may, in certain embodiments, be carried out in a reaction vessel containing only the ammonium-zinc decavanadate hexadecahydrate (($NH_4)_2$[$Zn(H_2O)_6]_2 \cdot V_{10}O_{28} \cdot 4H_2O$), the sodium borohydride and water.

However, the hydrolysis of $NaBH_4$ may optionally be performed in the presence of at least one base. In certain embodiments, the amount of base present should be such that the hydrolysis is conducted at a pH of from about 7 to about 10, for example from about 7 to about 9.

In that embodiment wherein the hydrolysis process comprises contacting an aqueous solution of sodium borohydride ($NaBH_4$) with crystalline particulate ammonium-zinc decavanadate hexadecahydrate (($NH_4)_2$[$Zn(H_2O)_6]_2 \cdot V_{10}O_{28} \cdot 4H_2O$), the aqueous solution of $NaBH_4$ may comprise, based on the weight of the solution, from about 0.1 to about 20 wt. % of the at least one base. The aqueous solution may preferably comprise from about 0.5 to about 2.5 wt. %, for example from about 0.5 to about 2 wt. % of said least one base, based on the weight of the solution.

Typically, the or each base present in the hydrolysis reaction will be selected from the group consisting of alkali metal hydroxides and alkali metal alkoxides. Suitable alkali metal alkoxides will conventionally be selected from aliphatic, aromatic or araliphatic alkoxides of lithium, sodium or potassium. Mention may be made of using the aliphatic ($C_1$-$C_4$)alkoxides, in particular methoxides, ethoxides, n-propoxides, isopropoxides, n-butoxides, sec-butoxides and tert-butoxides of sodium, potassium or lithium. However, it is preferred herein that the at least one base comprises sodium hydroxide.

In some embodiments, the ratio by weight of sodium borohydride ($NaBH_4$) to ammonium-zinc decavanadate hexadecahydrate in the hydrolysis reaction may range from about 1:2 to about 5:1, from about 1:2 to about 3:1, from about 1:2 to about 2:1, from about 1:2 to about 4:1, from about 1:2 to about 1:1, or from about 1:1 to about 2:1.

In some embodiments, during hydrolysis various gases may be formed in addition to hydrogen depending on the chemical composition and reaction conditions. A possible gaseous co-product is diborane. In preferred embodiment, however, the hydrolysis process results in the generation of hydrogen gas alone.

At step 54, the method 50 comprises capturing hydrogen gas evolved as a hydrolysis product. In some embodiments, methods for capturing hydrogen may include, but are not limited to, water displacement, gas collection bags, pressure collection in cylinders or tanks, cold trap collection, siphon collection, absorption into metal hydrides, membrane separation, and cryogenic collection.

Figure 1B:
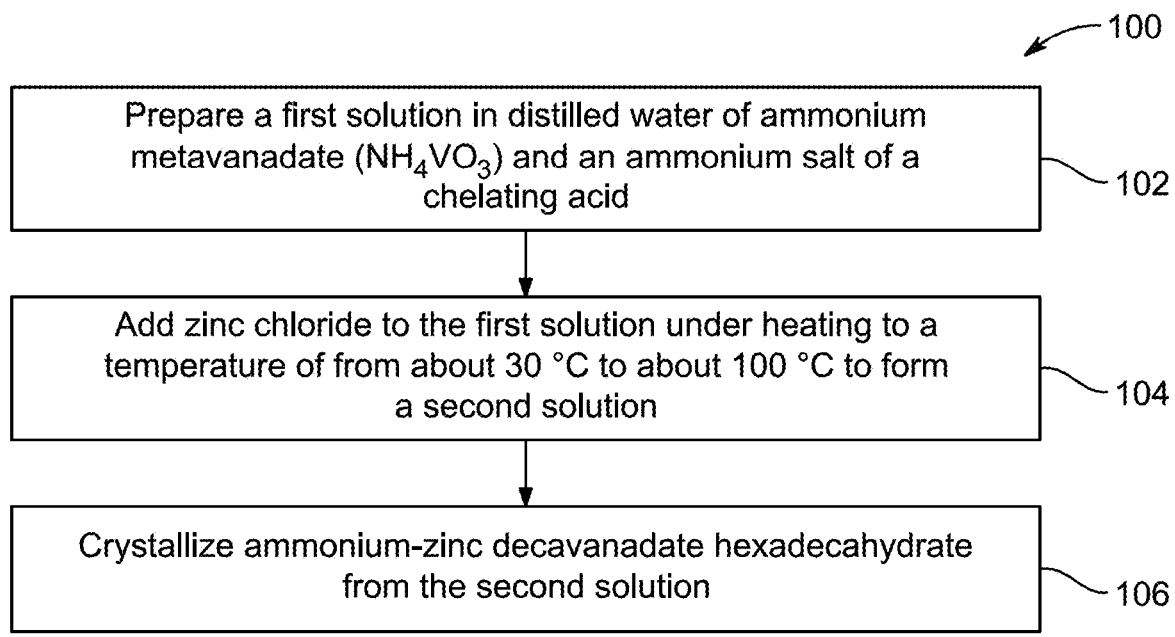
FIG. 1B is a flow chart of a method of forming the ammonium-zinc decavanadate hexadecahydrate $((NH_4)_2[Zn(H_2O)_6]_2 \cdot V_{10}O_{28} \cdot 4H_2O)$, according to certain embodiments.

FIG. 1B illustrates a schematic flow chart of a method 100 of forming the ammonium-zinc decavanadate hexadecahydrate (($NH_4)_2$[$Zn(H_2O)_6]_2 \cdot V_{10}O_{28} \cdot 4H_2O$). The order in which the method 100 is described is not intended to be construed as a limitation, and any number of the described method steps can be combined to implement the method 100. Additionally, individual steps may be removed or skipped from the method 100 without departing from the spirit and scope of the present disclosure.

At step 102, the method 100 comprises preparing a first solution in distilled water of ammonium metavanadate ($NH_4VO_3$) and an ammonium salt of a chelating acid.

In some embodiments, ammonium salts may include, but are not limited to, ammonium chloride, ammonium sulfate, ammonium nitrate, ammonium bicarbonate, ammonium carbonate, ammonium phosphate, ammonium dihydrogen phosphate, diammonium hydrogen phosphate, ammonium acetate, ammonium oxalate, ammonium thiocyanate, ammonium iodide, ammonium bromide, ammonium fluoride, ammonium persulfate, ammonium sulfamate, or combinations thereof. In a preferred embodiment, the ammonium salt is ammonium metavanadate.

In some embodiments, the concentration of ammonium metavanadate in the first solution may range from about 0.01 to about 0.3 moles per liter (M), for example from about 0.05 to about 0.3 M, from about 0.05 to about 0.2 M, from about 0.1 to about 0.25 M, or from about 0.15 to about 0.25 M. In a preferred embodiment, the concentration of ammonium metavanadate in the first solution is 0.2 M.

The "ammonium salt of chelating acid" typically refers to a chelating acid in its ammonium salt form. Suitable examples of the chelating acids may include, but are not limited to, citric acid, oxalic acid, tartaric acid, malic acid, succinic acid, maleic acid, fumaric acid, glutaric acid, malonic acid, phthalic acid, isophthalic acid, terephthalic acid, adipic acid, pimelic acid, suberic acid, azelaic acid, sebacic acid, pyromellitic acid, iminodiacetic acid, nitrilotriacetic acid, ethylenediaminetetraacetic acid (EDTA), diethylenetriaminepentaacetic acid (DTPA), ethylenebis(oxyethylenenitrilo)tetraacetic acid (EGTA), phosphoric acid, polyphosphoric acid, aminophosphonic acid, salicylic acid, and aspartic acid. In preferred embodiment, the chelating acid is an α-hydroxycarboxylic acid. In an embodiment, the ammonium salt of a chelating acid is one of an ammonium glycolate; ammonium lactate; ammonium citrate; ammonium tartrate; and, ammonium malate. In a preferred embodiment, the ammonium salt of chelating acid is ammonium tartrate.

In some embodiments, the concentration of the ammonium salt of the chelating acid in the first solution may range from about 0.01 to about 0.2 moles per liter (M), for example from about 0.05 to about 0.2 M or from about 0.05 to about 0.15 M. In preferred embodiment, the concentration of the ammonium salt of the chelating acid in the first solution is about 0.1 M.

In some embodiments, the molar ratio of ammonium metavanadate to ammonium tartrate is from about 5:1 to about 1:5, for example from about 4:1 to about 1:4 or from about 3:1 to about 1:3. In a preferred embodiment, the molar ratio of ammonium metavanadate to ammonium tartrate is about 2:1.

The first solution is prepared by adding particles of the ammonium metavanadate and particles of the ammonium salt of a chelating acid to distilled water; and, under stirring, heating to a temperature of from about 60 to about 100° C. In certain exemplary embodiments, such heating may be to a temperature of from about 65 to about 95° C., for instance from about 70 to about 90° C., from about 75 to about 85° C., or from about 80 to about 90° C.

At step 104, the method 100 comprises adding zinc chloride to the first solution under heating to a temperature of from about 30 to about 100° C. to form a second solution. The step of addition may, in some embodiments, be performed at a temperature of from about 40 to about 90° C. or from about 50 to about 90° C. In some embodiments, the first solution is filtered when still hot—such as at a temperature of from about 60 to about 100° C.—prior to the addition of zinc chloride.

In some embodiments, other zinc salts may be added to the first solution instead of or in combination with zinc chloride. Exemplary further salts, which may be used alone or in combination, include, but are not limited to, zinc sulfate, zinc nitrate, zinc phosphate, zinc carbonate, zinc oxide, zinc iodide, zinc bromide, zinc fluoride, zinc pyrophosphate, zinc hydroxide, zinc perchlorate, zinc silicate, zinc molybdate, zinc borate, zinc chromate, zinc sulphide, zinc arsenate and zinc tungstate.

In some embodiments, the zinc chloride is added to the first solution in an amount such that the molar ratio of zinc ($Zn^{2+}$) to metavanadate ($VO_3^-$) may range from about 1:3 to about 1:1, for example from about 1:2.5 to about 1:1, or from about 1:2.5 to about 1:1.5. In preferred embodiment, the zinc chloride is added to the first solution in an amount such that the molar ratio of zinc ($Zn^{2+}$) to metavanadate ($VO_3^-$) is about 1:2.

At step 106, the method 100 comprises crystallizing ammonium-zinc decavanadate hexadecahydrate from the second solution. There is no particular intention to limit the method by which crystallization is promoted: any technique which causes the second solution to reach a supersaturated state may be used. Exemplary methods include: cooling the second solution; evaporation of water from the second solution; addition of an antisolvent to the second solution; and, utilizing seed crystals to promote crystal nucleation and growth. In an embodiment, crystallization is effected by cooling the second solution at a temperature of from about 10 to about 25° C. in an undisturbed state for a sufficient duration.

In some embodiment, the crystallized ammonium-zinc decavanadate hexadecahydrate may have cubic, hexagonal, tetragonal, orthorhombic, monoclinic, triclinic, rhombohedral, face-centered cubic (FCC), body-centered cubic (BCC), and hexagonal close-packed (HCP). In preferred embodiment, the ammonium-zinc decavanadate hexadecahydrate is a crystalline particulate having a triclinic crystal system, as determined by single crystal X-ray crystallographic analysis.

The ammonium-zinc decavanadate hexadecahydrate has a three-dimensional crystalline structure, as determined by single crystal X-ray crystallographic analysis, comprising centrosymmetric $[V_{10}O_{28}]^{6-}$ anions linked via hydrogen bonding by two $NH_4^+$ cations, two $[Zn(H_2O)_6]_2^+$ cations and four water molecules.

In some embodiment, the ammonium-zinc decavanadate hexadecahydrate catalyzes the hydrolysis of the sodium borohydride to provide a hydrogen generation rate that may range from about 500 to about 5,000 mL $min^{-1}$ $g^{-1}$, for example from about 1000 to about 5,000 mL $min^{-1}$ $g^{-1}$, from about 1500 to about 5,000 mL $min^{-1}$ $g^{-1}$, from about 2000 to about 5,000 mL $min^{-1}$ $g^{-1}$, from about 2500 to about 5,000 mL $min^{-1}$ $g^{-1}$, from about 3000 to about 5,000 mL $min^{-1}$ $g^{-1}$, from about 3500 to about 5,000 mL $min^{-1}$ $g^{-1}$, from about 4000 to about 5,000 mL $min^{-1}$ $g^{-1}$, or from about 4500 to about 5,000 mL $min^{-1}$ $g^{-1}$.

EXAMPLES

The following examples demonstrate a method of producing hydrogen gas ($H_2$). The examples are provided solely for illustration and are not to be construed as limitations of the present disclosure, as many variations thereof are possible without departing from the spirit and scope of the present disclosure.

Example 1: Fabrication of Zinc-Vanadium (Zn—V) Cluster

According to the present disclosure, a triclinic decavanadate cluster $(NH_4)_2[Zn(H_2O)_6]_2 \cdot V_{10}O_{28} \cdot 4H_2O$, was synthesized by mixing 20 millimole (mmol) of ammonium metavanadate and 10 mmol of ammonium tartrate in 100 milliliters (mL) distilled water. Further, the above mixture was heated at from 90 to 100° C. and stirred vigorously until the mixture components were dissolved. Furthermore, in order to ensure absence of any solid particulates, the mixture was subject to hot filtration. In addition, 10 mmol zinc chloride was added to the hot solution and continuously heated for about 30 minutes. After cooling and filtration, the mixture was undisturbedly kept at room temperature and Zn—V cluster crystals were isolated after a week.

Figure 2:
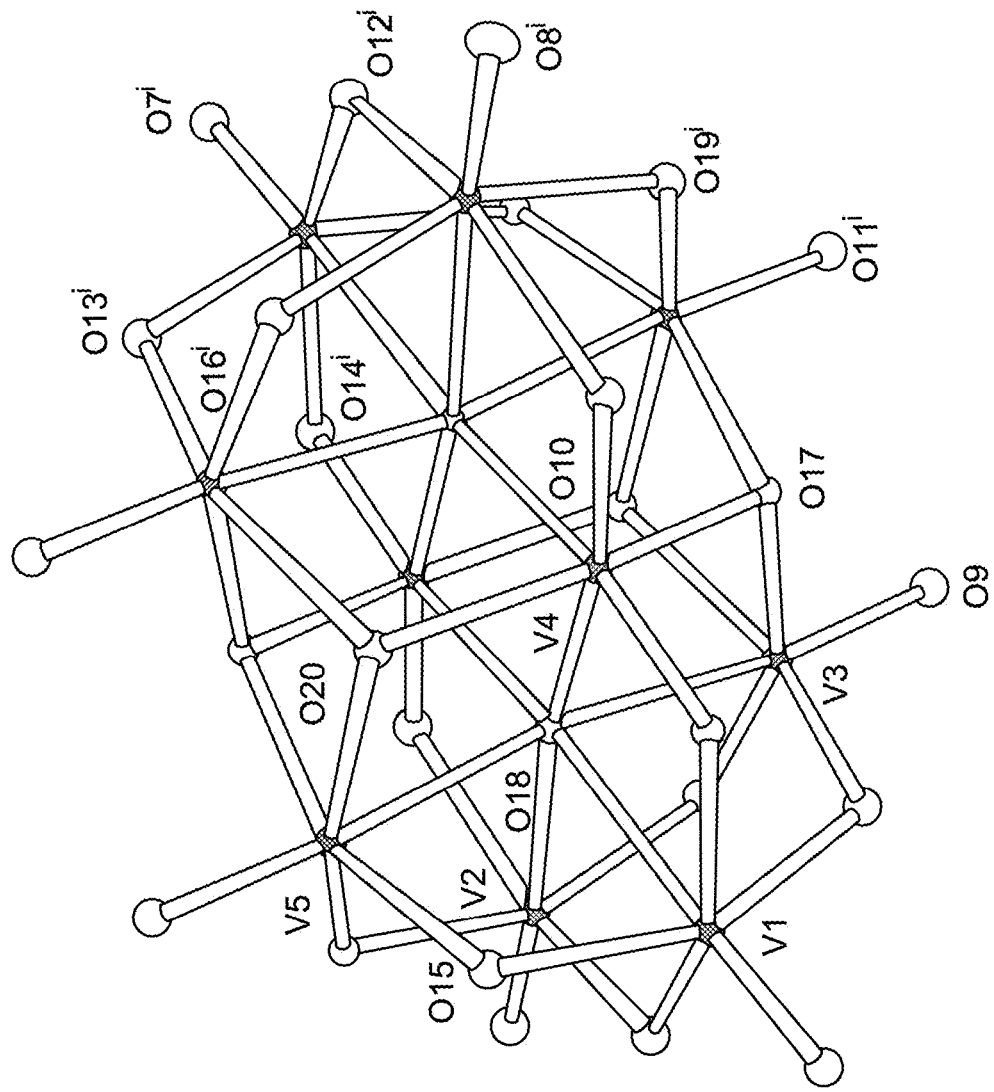
FIG. 2 is a schematic illustration of the ball-and-stick crystal structure of a Zn—V cluster obtained by single crystal analysis, according to certain embodiments.
Figure 2:
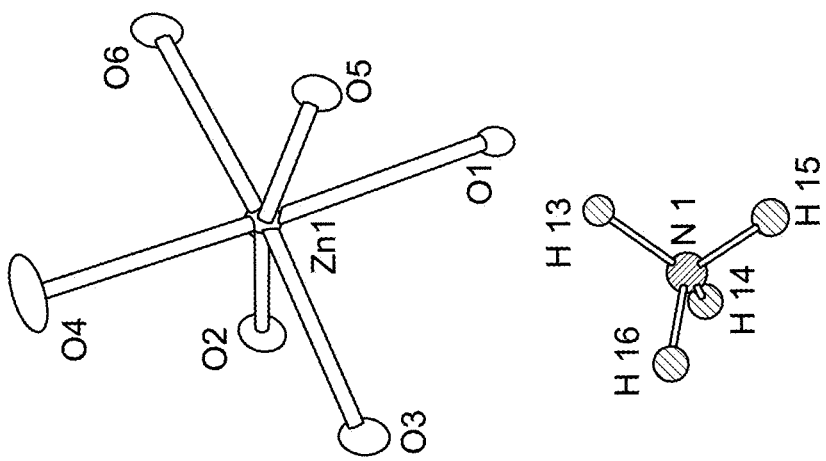

FIG. 2 shows the crystal structure of the Zn—V cluster, however all H atoms (except for H atoms of an ammonium cation), non-bonded water molecules, one $Zn(H_2O)_6$ cation and one ammonium cation have been removed for the sake of brevity in explanation. Detailed crystallographic data of the Zn—V cluster has been deposited in the Cambridge crystallographic data center (CCDC), with the depository number of '2388703'—the disclosure of which is herein incorporated by reference in its entirety—and may further be obtained for free, from www.ccdc.cam.ac.uk/structures'.

Example 2: Generation of $H_2$ from Hydrolysis of $NaBH_4$

For hydrogen production, $NaBH_4$ was hydrolyzed by reaction with distilled water in the presence of the triclinic decavanadate cluster $(NH_4)_2[Zn(H_2O)_6]_2 \cdot V_{10}O_{28} \cdot 4H_2O$ obtained in Example 1; the hydrogen gas evolved as a hydrolysis product was captured and quantified volumetrically at 1 atmosphere (0.1 MPa) pressure. The effect of varying the weight of $NaBH_4$ provided to the catalytic hydrolysis reaction performed at 25° C. over 0.5 g triclinic decavanadate cluster $(NH_4)_2[Zn(H_2O)_6]_2 \cdot V_{10}O_{28} \cdot 4H_2O$ was studied. Furthermore, the effect of reaction temperature on the catalytic hydrolysis of 0.5 g of $NaBH_4$ was also examined in the temperature range of 28-45° C. using 0.5 g of triclinic decavanadate cluster $(NH_4)_2[Zn(H_2O)_6]_2 \cdot V_{10}O_{28} \cdot 4H_2O$.

Figure 3A:
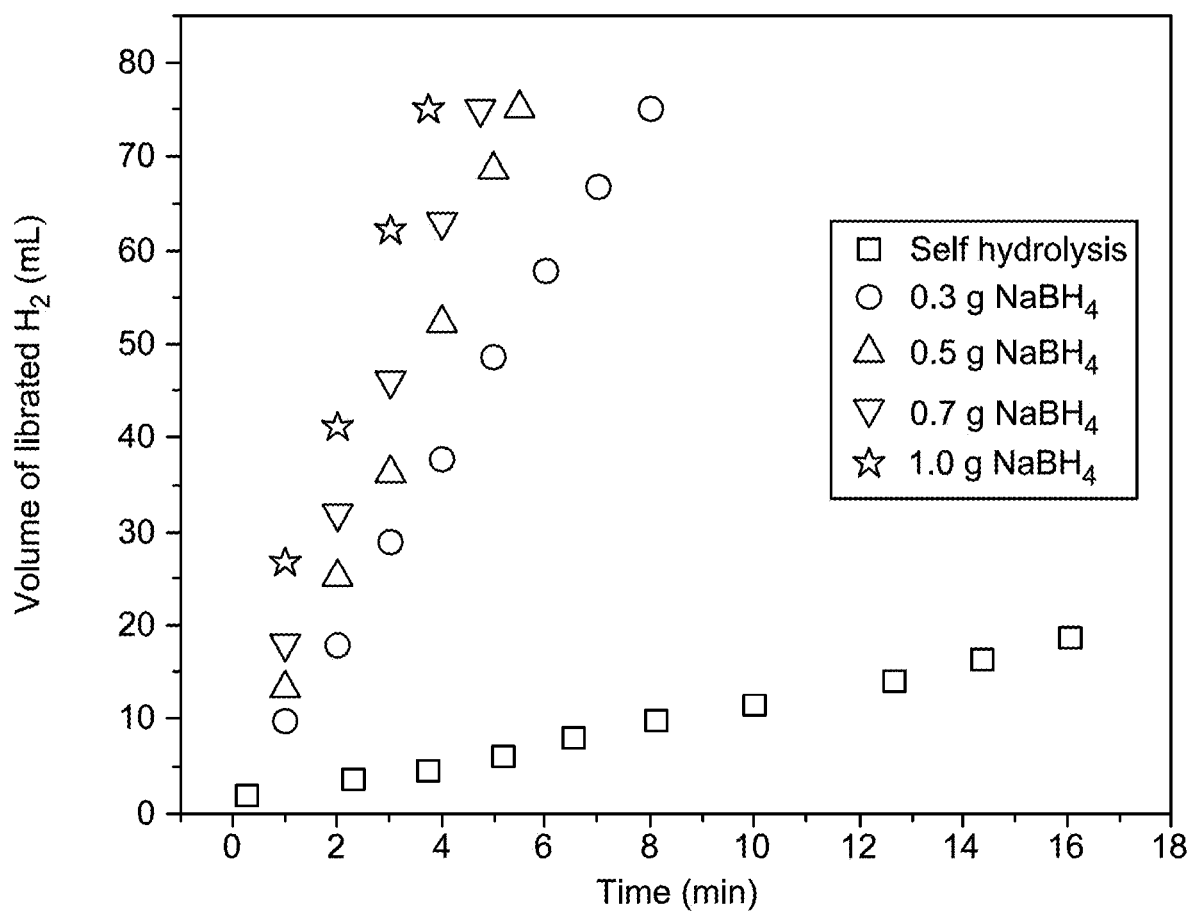
FIG. 3A is a graph depicting the variation in the liberated volume of hydrogen gas with reaction time, over the Zn—V cluster at a reaction temperature of about 25° C., according to certain embodiments.
Figure 3B:
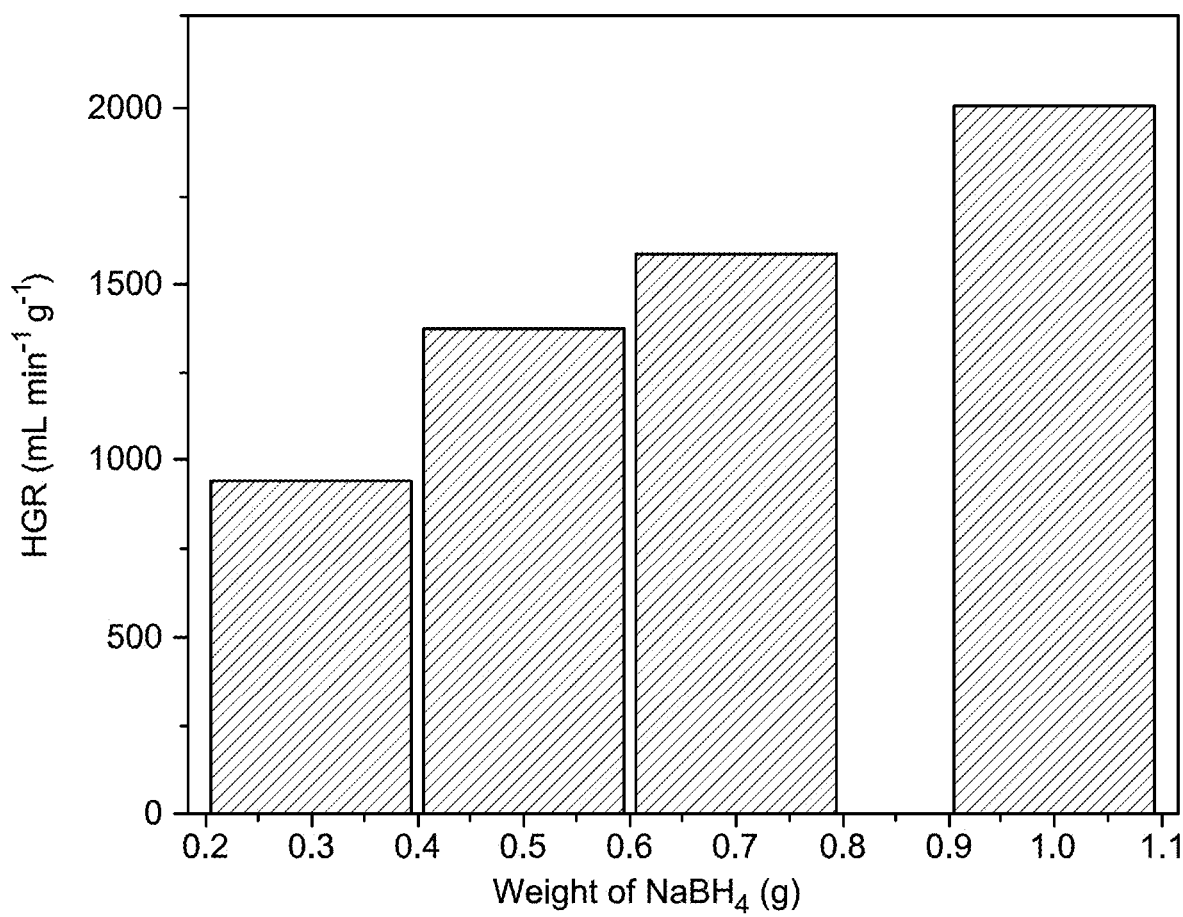
FIG. 3B is a graph depicting the hydrogen generation rate (HGR) with respect to weight of $NaBH_4$, over the Zn—V cluster at a reaction temperature of about 25° C., according to certain embodiments.
Figure 4A:
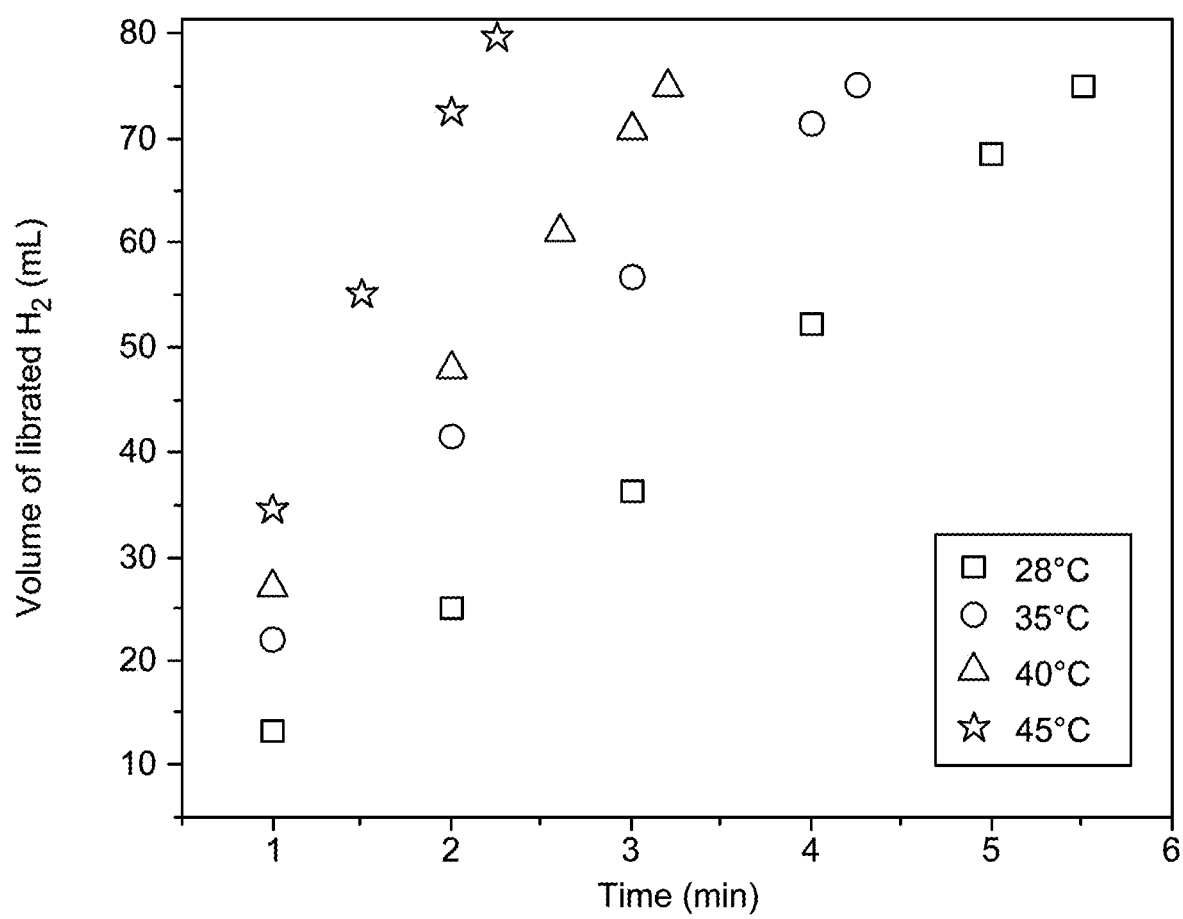
FIG. 4A is a graph depicting the variation in liberated volume of hydrogen with respect to reaction time, over the Zn—V cluster at reaction temperatures of independently about 25° C., about 35° C., about 40° C. and about 45° C., according to certain embodiments.
Figure 4B:
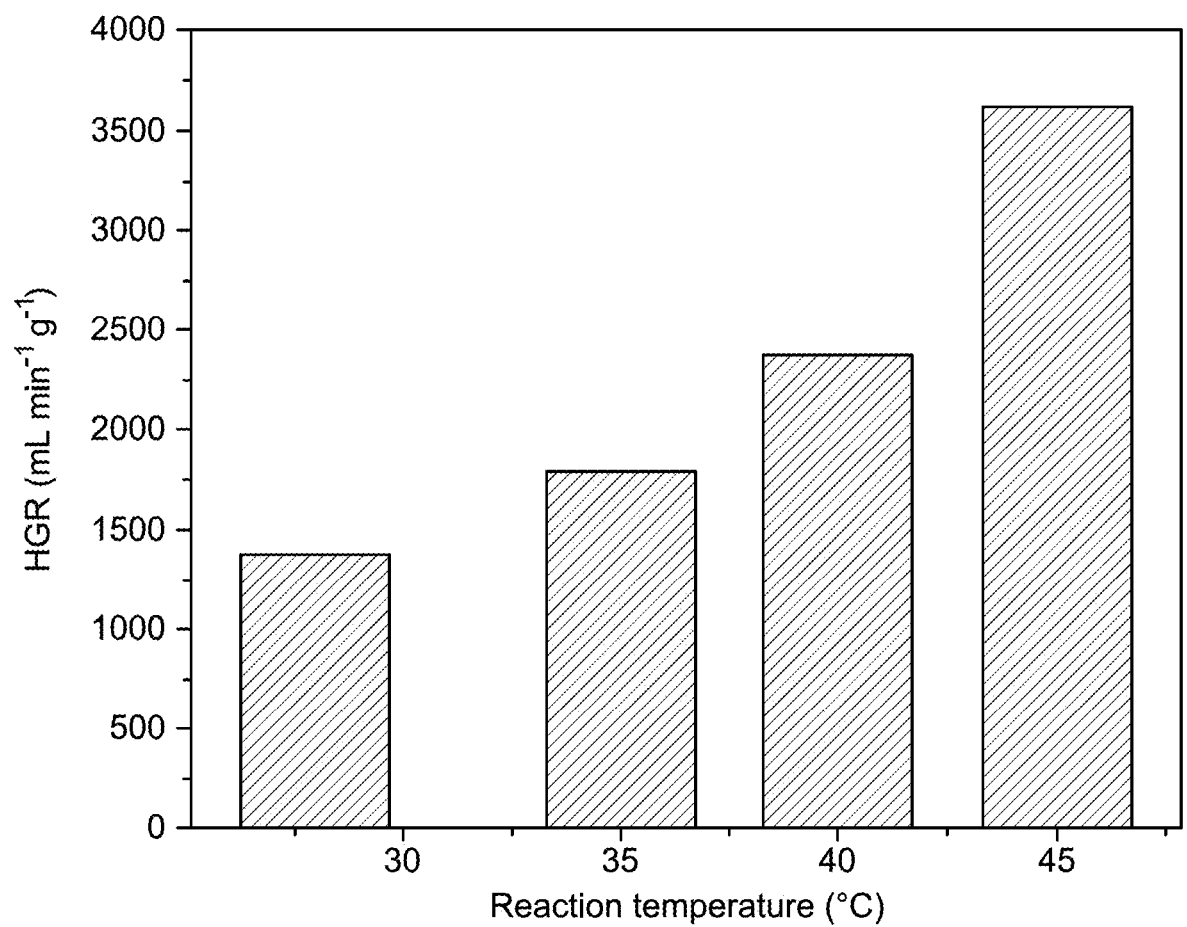
FIG. 4B is a graph depicting the variation of hydrogen generation rate (HGR) with respect to varied reaction temperature, over the Zn—V cluster at reaction temperatures of independently about 25° C., about 35° C., about 40° C. and about 45° C., according to certain embodiments.

The results of hydrolysis of $NaBH_4$ with and without Zn—V cluster is shown in FIGS. 3A-3B. The catalytic action of the Zn—V cluster was evidently observed where catalyst exhibited catalytic activity higher than the self-hydrolysis process at 25° C., as shown in FIG. 3A. Results further indicate that, at a reaction temperature of about 25° C., hydrogen generation rate (HGR) increases with increasing the weight of $NaBH_4$. The values of HGR obtained were about 938 mL $min^{-1}$ $g^{-1}$, 1363 mL $min^{-1}$ $g^{-1}$, 1580 mL $min^{-1}$ $g^{-1}$, and 2000 mL $min^{-1}$ $g^{-1}$ corresponding to an $NaBH_4$ weight of 0.3 g, 0.5 g, 0.7 g, and 1.0 g respectively, as shown in FIG. 3B. Influence of reaction temperature on the catalytic hydrolysis process was also examined at a temperature range of about 28° C. to 45° C., using 0.5 g of $NaBH_4$, as shown in FIGS. 4A-4B. Furthermore, HGR values of 1363 mL $min^{-1}$ $g^{-1}$, 1782 mL $min^{-1}$ $g^{-1}$, 2373 mL $min^{-1}$ $g^{-1}$, and 3625 mL $min^{-1}$ $g^{-1}$ were obtained at reaction temperatures of about 28° C., 35° C., 40° C., and 45° C., respectively. Activation energy for the aforementioned hydrolysis reaction was calculated to be about 41.4 kJ/mol.

The aspects of the present disclosure provide the method of producing hydrogen gas via Zn—V cluster. In particular, the Zn—V (($NH_4$)$_2$[Zn($H_2O$)$_6$]$_2$·$V_{10}O_{28}$·4$H_2O$) cluster was successfully fabricated by the method as described in accordance with the present disclosure. The synthesized Zn—V was characterized by X-ray diffraction (XRD) and single crystal analysis. Through chemical and morphological analyses, the structure of the cluster was confirmed to be (($NH_4$)$_2$[Zn($H_2O$)$_6$]$_2$$V_{10}O_{28}$·4$H_2O$). In addition, the detailed crystallographic data of this compound has been deposited in the CCDC depository. Catalytic activity results revealed that the fabricated Zn—V cluster was able to hydrolyze the $NaBH_4$ with HGR of 938 mL $min^{-1}$ $g^{-1}$, 1363 mL $min^{-1}$ $g^{-1}$, 1580 mL $min^{-1}$ $g^{-1}$, and 2000 mL $min^{-1}$ $g^{-1}$ corresponding to weight of $NaBH_4$ of 0.3 g, 0.5 g, 0.7 g, and 1.0 g, respectively at about 28° C. Furthermore, HGR values of 1363 mL $min^{-1}$ $g^{-1}$, 1782 mL $min^1$ $g^{-1}$, 2373 mL $min^{-1}$ $g^{-1}$, and 3625 mL $min^{-1}$ $g^{-1}$ were obtained at reaction temperatures of 28° C., 35° C., 40° C., and 45° C., respectively. Presently, the above-described values may be considered desirable.

Numerous modifications and variations of the present disclosure are possible in light of the above teachings. It is therefore to be understood that within the scope of the appended claims, the invention may be practiced otherwise than as specifically described herein.

The invention claimed is:

1. A method of producing hydrogen gas comprising:
hydrolyzing sodium borohydride ($NaBH_4$) with water at a temperature of from about 20 to about 75° C. in a presence of ammonium-zinc decavanadate hexadecahydrate (($NH_4$)$_2$[Zn($H_2O$)$_6$]$_2$·$V_{10}O_{28}$·4$H_2O$); and,
capturing hydrogen gas formed by the hydrolyzing.

2. The method according to claim 1, wherein the ammonium-zinc decavanadate hexadecahydrate (($NH_4$)$_2$[Zn($H_2O$)$_6$]$_2$·$V_{10}O_{28}$·4$H_2O$) is a crystalline particulate having a triclinic crystal system, as determined by single crystal X-ray crystallographic analysis.

3. The method according to claim 1, wherein the ammonium-zinc decavanadate hexadecahydrate (($NH_4$)$_2$[Zn($H_2O$)$_6$]$_2$·$V_{10}O_{28}$·4$H_2O$) has a three-dimensional crystalline structure, as determined by single crystal X-ray crystallographic analysis, comprising centrosymmetric [$V_{10}O_{28}$]$^{6-}$ anions linked via hydrogen bonding by two $NH_4^+$ cations, two [Zn($H_2O$)$_6$]$_2^+$ cations and four water molecules, and
wherein the ammonium-zinc decavanadate hexadecahydrate (($NH_4$)$_2$[Zn($H_2O$)$_6$]$_2$·$V_{10}O_{28}$·4$H_2O$) catalyzes the hydrolysis of the sodium borohydride to provide a hydrogen generation rate of about 500 to about 5,000 mL $min^{-1}$ $g^{-1}$.

4. The method according to claim 1, wherein the hydrolyzing includes mixing water with a solid mixture comprising particles of the sodium borohydride ($NaBH_4$) and crystalline particles of the ammonium-zinc decavanadate hexadecahydrate (($NH_4$)$_2$[Zn($H_2O$)$_6$]$_2$·$V_{10}O_{28}$·4$H_2O$).

5. The method according to claim 1, wherein the hydrolyzing comprises contacting an aqueous solution of sodium borohydride ($NaBH_4$) with crystalline particulate ammonium-zinc decavanadate hexadecahydrate (($NH_4$)$_2$[Zn($H_2O$)$_6$]$_2$·$V_{10}O_{28}$·4$H_2O$) at a temperature of from about 20° C. to about 75° C.

6. The method according to claim 5, wherein the aqueous solution comprises from about 5 wt. % to about 20 wt. % of sodium borohydride ($NaBH_4$) based on the weight of the solution, and wherein during the hydrolyzing hydrogen gas is the only gas formed.

7. The method according to claim 5, wherein the aqueous solution comprises from about 5 wt. % to about 15 wt. % of sodium borohydride ($NaBH_4$) based on the weight of the solution, and
wherein the hydrolyzing is carried out in a reaction vessel containing only the ammonium-zinc decavanadate hexadecahydrate (($NH_4$)$_2$[Zn($H_2O$)$_6$]$_2$·$V_{10}O_{28}$·4$H_2O$), the sodium borohydride and water.

8. The method according to claim 5, wherein the aqueous solution further comprises from about 1 wt. % to about 20 wt. % of sodium hydroxide (NaOH) based on the weight of the solution.

9. The method according to claim 1, wherein the hydrolysis temperature is from about 25° C. to about 60° C.

10. The method according to claim 1, wherein the hydrolysis temperature is from about 25° C. to about 50° C.

11. The method according to claim 1, wherein the ratio by weight of sodium borohydride to ammonium-zinc decavanadate hexadecahydrate is from about 1:2 to about 5:1.

12. The method according to claim 1, wherein the ratio by weight of sodium borohydride to ammonium-zinc decavanadate hexadecahydrate is from about 1:2 to about 3:1.

13. The method according to claim 1, wherein the ratio by weight of sodium borohydride to ammonium-zinc decavanadate hexadecahydrate is from about 1:2 to about 2:1.

14. A method according to claim 1, further comprising:
forming the ammonium-zinc decavanadate hexadecahydrate (($NH_4$)$_2$[Zn($H_2O$)$_6$]$_2$·$V_{10}O_{28}$·4$H_2O$) by:
preparing a first solution in distilled water of ammonium metavanadate ($NH_4VO_3$) and an ammonium salt of a chelating acid;
adding zinc chloride to the first solution under heating to a temperature of from about 30° C. to about 100° C. to form a second solution; and,
crystallizing ammonium-zinc decavanadate hexadecahydrate from the second solution.

15. The method according to claim 14, wherein the chelating acid is an α-hydroxycarboxylic acid.

16. The method according to claim 14, wherein the ammonium salt of a chelating acid is selected from the group consisting of: ammonium glycolate; ammonium lactate; ammonium citrate; ammonium tartrate; and ammonium malate.

17. The method according to claim 14, wherein the first solution is prepared by:
adding particles of the ammonium metavanadate and particles of the ammonium salt of a chelating acid to distilled water; and,
under stirring, heating the obtained mixture to a temperature of from about 60° C. to about 100° C.

18. The method according to claim 17, wherein the first solution is filtered at a temperature of from about 60° C. to about 100° C. prior to the addition of zinc chloride thereto.

19. The method according to claim 14, wherein the zinc chloride is added to the first solution in an amount such that the molar ratio of zinc ($Zn^{2+}$) to metavanadate ($VO_3^-$) is from about 1:3 to about 1:1.

20. The method according to claim 14, wherein the zinc chloride is added to the first solution in an amount such that the molar ratio of zinc ($Zn^{2+}$) to metavanadate ($VO_3^-$) is about 1:2.

* * * * *